United States Patent [19]
Wegehaupt et al.

[11] Patent Number: 4,902,813
[45] Date of Patent: Feb. 20, 1990

[54] PROCESS FOR PREPARING DIORGANOPOLYSILOXANES HAVING TERMINAL SI-BONDED HYDROXYL GROUPS

[75] Inventors: Karl-Heinrich Wegehaupt; Karl Braunsperger; Günter von Au; Fridolin Stary, all of Burghausen, Fed. Rep. of Germany

[73] Assignee: Wacker-Chemie GmbH, Munich, Fed. Rep. of Germany

[21] Appl. No.: 280,852

[22] Filed: Dec. 7, 1988

[30] Foreign Application Priority Data

Dec. 11, 1987 [DE] Fed. Rep. of Germany ....... 3742068

[51] Int. Cl.$^4$ .............................................. C07F 7/08
[52] U.S. Cl. .................................................... 556/459
[58] Field of Search ......................................... 556/459

[56] References Cited

U.S. PATENT DOCUMENTS

| | | | |
|---|---|---|---|
| 2,830,967 | 4/1958 | Nitzsche et al. | 556/459 X |
| 3,160,601 | 12/1964 | Hyde | 556/459 X |
| 3,705,205 | 12/1972 | Autoneu | 556/459 X |
| 3,839,388 | 10/1974 | Nitzsche et al. | 556/459 X |
| 3,902,047 | 9/1975 | Ashby | 556/459 X |
| 4,053,494 | 10/1977 | Burkhardt | 556/459 X |
| 4,762,937 | 8/1988 | Ottlinger et al. | 556/459 |

Primary Examiner—Paul F. Shaver

[57] ABSTRACT

A process for preparing diorganopolysiloxanes having terminal Si-bonded hydroxyl groups which comprises reacting an organosilicon compound selected from a cyclic diorganopolysiloxane, a diorganodichlorosilane hydrolysis product and mixtures thereof with from 0.1 to 3 percent by weight of a diorganodichlorosilane, based on the weight of the organosilicon compound, i.e., the cyclic diorganopolysiloxane and/or diorganodichlorosilane hydrolysis product employed, in the presence of from 1 to 50 ppm by weight of phosphonitrile chloride, based on the total weight of the organosilicon compound and diorganodichlorosilane employed, to form diorganopolysiloxanes containing an Si-bonded chlorine atom in each of the terminal units, then treating the reaction mixture with water or an aqueous solution, separating off the aqueous phase from the diorganopolysiloxanes containing an Si-bonded hydroxyl group in each of the terminal units and thereafter removing the low boiling constituents by distillation.

7 Claims, No Drawings

PROCESS FOR PREPARING DIORGANOPOLYSILOXANES HAVING TERMINAL SI-BONDED HYDROXYL GROUPS

The present invention relates to a process for preparing organopolysiloxanes and more particularly to a process for preparing diorganosiloxanes having terminal Si-bonded hydroxyl groups.

BACKGROUND OF THE INVENTION

It is known from British Pat. No. 1,195,761 to Wacker-Chemie that organohalosilicon compounds can be prepared by reacting halosilicon compounds with organosiloxanes which are free of Si-bonded halogen in the presence of phosphonitrile chloride. According to the teachings of the British patent, substantially greater amounts of halosilicon compounds and phosphonitrile chloride were employed than is employed in the present invention. Moreover, the British patent does not describe the preparation of diorganopolysiloxanes having terminal Si-bonded hydroxyl groups. Furthermore, the British patent does not describe a process for controlling the viscosity and molecular weight distribution of the diorganopolysiloxanes.

Therefore, it is an object of the present invention to provide a process for preparing diorganopolysiloxanes containing terminal Si-bonded hydroxyl groups, in which the viscosity of these diorganopolysiloxanes can be controlled. Another object of the present invention is to provide a process for preparing diorganopolysiloxanes having terminal Si-bonded hydroxyl groups from readily available organosilicon compounds in good yields. A further object of the present invention is to provide a process for preparing diorganopolysiloxanes having terminal Si-bonded hydroxyl groups having a narrow molecular weight distribution.

SUMMARY OF THE INVENTION

The foregoing objects and others which will become apparent from the following description are accomplished in accordance with this invention, generally speaking, by providing a process for preparing diorganopolysiloxanes having terminal Si-bonded hydroxyl groups which comprises reacting an organosilicon compound selected from the group consisting of a cyclic diorganopolysiloxane, a dorganodichlorosilane hydrolysis product and mixtures thereof with from 0.1 to 3 percent by weight of a diorganodichlorosilane, based on the weight of the organosilicon compound, that is, the cyclic diorganopolysiloxane and/or diorganodichlorosilane hydrolysis product employed, in the presence of from 1 to 50 ppm by weight of phosphonitrile chloride, based on the total weight of the organosilicon compound and the diorganodichlorosilane employed, to form diorganopolysiloxanes containing an Si-bonded chlorine atom in each of the terminal units, treating the reaction mixture with water or an aqueous solution, separating off the aqueous phase and thereafter distilling off the low boiling constituents from the diorganopolysiloxanes containing terminal Si-bonded hydroxyl groups.

DESCRIPTION OF THE INVENTION

The cyclic diorganopolysiloxane used in the process of this invention is preferably one having the formula $(R_2SiO)_n$ wherein R represents the same or different hydrocarbon radicals having from 1 to 18 carbon atom(s) per radical and halogenated hydrocarbon radicals having from 1 to 18 carbon atom(s) per radical and n is an integer having a value of from 3 to 11.

Only one type of cyclic diorganopolysiloxane need be used, or a mixture of at least two different types of cyclic diorganopolysiloxanes, in which the difference may be different ring sizes and/or different substituents on the silicon atoms can be used.

The diorganodichlorosilane hydrolysis product used in the process of this invention is preferably one which consists of from 20 to 30 percent by weight of cyclic diorganopolysiloxanes of the formula $(R_2SiO)_n$ and from 70 to 80 percent by weight of diorganopolysiloxanes of the formula $HO(R_2SiO\ SiR_2O)_mH$ based on the weight of the diorganodichlorosilane hydrolysis product employed, in which R and n are the same as above and m is an integer having a value of from 20 to 50.

The diorganodichlorosilane used in the process of this invention preferably has the formula $R_2SiCl_2,$ where R is the same as above.

Examples of hydrocarbon radicals represented by R are alkyl radicals, such as the methyl and ethyl radicals as well as the butyl, decyl and octadecyl radicals; hydrocarbon radicals having at least one aliphatic multiple bond, such as the vinyl radical; aryl radicals, such as the phenyl radical; alkaryl radicals, such as the tolyl radicals; and aralkyl radicals, such as the benzyl radical. Examples of halogenated hydrocarbon radicals represented by R are halogenoalkyl radicals, such as the 3,3,3-trifluoropropyl radical and halogenoaryl radicals, such as the o-, p- and m-chlorophenyl radicals. At least 70 percent of the number of organic radicals in the organosilicon compounds used in the process of this invention are preferably methyl radicals, because of their availability.

The viscosity of the resultant diorganopolysiloxane having terminal Si-bonded hydroxyl groups can be controlled by the amount of diorganodichlorosilane, which is reacted with the cyclic diorganopolysiloxane and/or diorganodichlorosilane hydrolysis product. The amount of diorganodichlorosilane preferably ranges from 0.1 to 3 percent by weight, based on the weight of the organosilicon compound, that is the cyclic diorganopolysiloxane and/or diorganodichlorosilane hydrolysis product employed.

The phosphonitrile chlorides employed in the reaction of the cyclic diorganopolysiloxane and/or diorganodichlorosilane hydrolysis product with the diorganodichlorosilane can be, for example, those which have been prepared by reacting 400 parts by weight of phosphorus pentachloride with 130 parts by weight of ammonium chloride (compare, for example, "Bericht der Deutschen Chemischen Gesellschaft", year 57, 1924, page 345), or those which are obtained by reacting 2 mols of phosphorus pentachloride with 1 mol of ammonium chloride (such as described, for example, in U.S. Pat. No. 3,839,388 to Nitzsche et al). Mixtures of at least two different types of phosphonitrile chlorides can of course be used.

The phosphonitrile chloride is used in an amount of from 1 to 50 ppm by weight, and more preferably in an amount of from 20 to 40 ppm by weight, based on the weight of the organosilicon compounds, that is, the cyclic diorganopolysiloxane and/or diorganodichlorosilane hydrolysis product and the diorganodichlorosilane employed.

The reaction of the cyclic diorganopolysiloxane nd/or diorganodichlorosilane hydrolysis product with the diorganodichlorosilane in the presence of phosphonitrile chloride is carried out at a temperature of preferably from 60° to 100° C., and more preferably from 70° to 90° C., and preferably at the pressure of the surrounding atmosphere, that is to say at 1020 hPa (absolute) or about 1020 hPa (absolute). If desired, however, it is also possible to use higher or lower pressures during the reaction. The preferred reaction times are in the range of from 3 to 8 hours.

After the reaction of the cyclic diorganopolysiloxane and/or diorganodichlorosilane hydrolysis product with the diorganodichlorosilane in the presence of phosphonitrile chloride to form the diorganopolysiloxane containing an Si-bonded chlorine atom in each of the terminal units, the reaction mixture is treated with water or an aqueous solution and the aqueous phase is then separated from the organic phase.

The reaction mixture is washed several times with water in order to reduce the acid content of the reaction mixture. During the washing operation, both the phosphonitrile chloride and its reaction products are at the same time removed from the reaction mixture.

Instead of water, it is also possible to use an alkali aqueous solution, for example, an aqueous solution of $NaHCO_3$, in order to reduce the number of washing operations, if desired.

The reaction mixture can also be treated with water in vapor form instead of with water in liquid form, in which case water in vapor form is passed through the reaction mixture. The treatment with steam has the advantage that the aqueous phase is separated from the organic phase by passing steam through the reaction mixture and at the same time volatile constituents, such as, for example, unreacted cyclic diorganopolysiloxanes, are simultaneously driven off.

The reaction mixture is treated with water in liquid or vapor form or with an aqueous solution until it has a pH preferably in the range of from 5 to 9, and more preferably at about 7.

In order to enhance the separation of the organic phase from the aqueous phase, a water-immiscible inert organic solvent having a density of less than 1 g/cm³ at 20° C. may be added to the reaction mixture. Examples of suitable solvents are, for example, benzene, toluene or xylene. The solvents are added in amounts of up to 100 percent by weight, based on the weight of the organosilicon compounds employed.

After the aqueous phase has been separated from the organic phase, any organic solvent added is removed from the organic phase by distillation.

The low boiling constituents, which are, in particular, cyclic diorganopolysiloxanes, are separated from the desired diorganopolysiloxanes containing an Si-bonded hydroxyl group in each of the terminal units by distillation. The distillation is preferably carried out at 140° to 150° C. and under 0.5 to 8 hPa (absolute).

The diorganopolysiloxanes which are prepared by the process of this invention and have an Si-bonded hydroxyl group in each of the terminal units have a viscosity of preferably from 250 to 50,000 mPa.s at 25° C. and preferably contain 0.038 to 0.38 percent by weight of Si-bonded hydroxyl groups, based on the weight of these diorganopolysiloxanes.

The diorganopolysiloxanes which are prepared by the process of this invention and contain an Si-bonded hydroxyl group in each of the terminal units may be further condensed to form higher molecular weight diorganopolysiloxanes. In particular, considerably less phosphonitrile chloride is required than was previously required for the further condensation of these diorganopolysiloxanes in the presence of phosphonitrile chloride.

The diorganopolysiloxanes which are prepared by the process of this invention and have an Si-bonded hydroxyl group in each of the terminal units are suitable, for example, as additives for compositions which are based on diorganopolysiloxanes and can be crosslinked at room temperature or at higher temperatures.

The phosphonitrile chloride used in the examples was prepared in the following manner:

A mixture containing 417 g (2 mols) of phosphorus pentachloride and 53.3 g (1 mol) of ammonium chloride in 1000 ml of tetrachloroethane is heated under reflux at the boiling point for 12 hours. The volatile constituents are removed from the resultant pale yellow solution at 160° C. while reducing the pressure to about 1.33 hPa (absolute). Yellowish crystals which consist essentially of a compound of the formula $Cl_3PNPCl_2NPCl_3 \cdot PCl_6$ are recovered as the residue.

EXAMPLE 1

About 200 g of a mixture containing cyclic dimethylpolysiloxanes having 3 to 11 siloxane units per molecule, in which octamethylcyclotetrasiloxane is the major component, are mixed with 2 g of dimethyldichlorosilane and 0.04 ml of a 25 percent by weight solution of phosphonitrile chloride in methylene chloride in a glass flask which can be heated and has a discharge tap, stirrer and distillation attachment. The reaction mixture is heated to 80° C. and stirred slowly at 80° C. for 5 hours. About 100 ml of toluene are then added to the reaction mixture and the organic phase is washed several times with 200 ml of water each time until free from acid and until the organic phase has a pH of about 7. After the aqueous phase has been separated off, the toluene is removed from the organic phase by distillation. After the substances which boil at 140°0 to 150° C. under 1 to 3 hPa (absolute) have been distilled off, 180 g (90 percent of theory) of a water-clear dimethylpolysiloxane are obtained having an Si-bonded hydroxyl group in each of the terminal units and a viscosity of 2,120 mPa.s at 25° C. and an Si-bonded hydroxyl content of 0.1 percent by weight.

EXAMPLE 2 to 4

The procedure described in Example 1 is repeated, except that instead of the 2 g of dimethyldichlorosilane, the amount of dimethyldichlorosilane stated in Table 1 is used. The yields of the dimethylpolysiloxane containing an Si-bonded hydroxyl group in each of the terminal units, the viscosity and the Si-bonded hydroxyl content are shown in Table 1. It is apparent from Table 1, that the viscosity of the end product can be controlled by the amount of dimethyldichlorosilane employed.

TABLE 1

| Exam- ples | (CH₃)₂SiCl₂ g | (CH₃)₂SiCl₂ % by weight[2] | Yield of dimethylpolysiloxane g | Yield of dimethylpolysiloxane % of theory | Viscosity mPa.s at (25° C.) | OH content[1] % by weight |
|---|---|---|---|---|---|---|
| 1 | 2 | 1 | 180 | 90 | 2,120 | 0.1 |
| 2 | 4 | 2 | 170 | 85 | 500 | 0.19 |
| 3 | 1 | 0.5 | 176 | 88 | 7,255 | 0.06 |
| 4 | 0.5 | 0.25 | 170 | 85 | 18,000 | 0.04 |

[1] Content of Si-bonded hydroxyl groups determined by the Zerewitenoff method.
[2] Based on the weight of cyclic dimethylpolysiloxane employed.

EXAMPLES 5 to 9

The procedure in Example 1 is repeated, except that 200 g of dimethyldichlorosilane hydrolysis product which consists of a mixture containing 30 percent by weight of cyclic dimethylpolysiloxanes having 3 to 11 siloxane units per molecule and 70 percent by weight of dimethylpolysiloxanediols having 20 to 50 siloxane unit per molecule are substituted for the 200 g of the mixture of cyclic dimethylpolysiloxanes used in Example 1. The amount of dimethyldichlorosilane stated in Table 2 is substituted for the 2 g of dimethyldichlorosilane used in Example 1. The yields of dimethylpolysiloxane containing an Si-bonded hydroxyl group in each of the terminal units, the viscosity ad the Si-bonded hydroxyl content are stated in Table 2. It is apparent from Table 2, that the viscosity of the end product can be controlled by the amount of dimethyldichlorosilane employed.

TABLE 2

| Exam- ples | (CH₃)₂SiCl₂ g | (CH₃)₂SiCl₂ % by weight[2] | Yield of dimethylpolysiloxane g | Yield of dimethylpolysiloxane % of theory | Viscosity mPa.s at (25° C.) | OH content[1] % by weight |
|---|---|---|---|---|---|---|
| 5 | 6 | 3 | 187 | 93.5 | 587 | 0.19 |
| 6 | 4 | 2 | 182 | 91 | 1,530 | 0.11 |
| 7 | 2 | 1 | 177 | 88.5 | 3,130 | 0.07 |
| 8 | 1.5 | 0.75 | 176 | 88 | 6,400 | 0.06 |
| 9 | 1 | 0.5 | 174 | 87 | 24,000 | 0.04 |

[1] Content of Si-bonded hydroxyl groups determined by the Zerewitenoff method.
[2] Based on the weight of dimethyldichlorosilane hydrolysis product employed.

EXAMPLE 10

The procedure of Example 1 is repeated, except that no toluene is added to the reaction mixture after a reaction time of 5 hours and that instead of washing the organic phase with water in liquid form, steam is passed through the reaction mixture until the reaction mixture has a pH of about 7. The volatile constituents are simultaneously driven off, since on subsequent heating of the reaction mixture at 150° C. and at 1 hPa (absolute), nothing further is distilled off. About 174 g (86 percent of theory) of a water-clear dimethylpolysiloxane is obtained as residue having an Si-bonded hydroxyl group in each of the terminal units and a viscosity of 3,500 mPa.s at 25° C. and an Si-bonded hydroxyl content of 0.07 percent by weight.

The dimethylpolysiloxanes which are prepared in Examples 1 to 10 and contain an Si-bonded hydroxyl group in each of the terminal unit have a narrow molecular weight distribution, as determined by gel chromatography.

EXAMPLE 11

This example shows that satisfactory yields of end product are obtained after reaction times of 3 hours. This example is similar to Example 1, where 200 g of the mixture used in Example 1, containing cyclic diorganopolysiloxanes having 3 to 11 siloxane units per molecule are mixed with 2 g of dimethyldichlorosilane and 0.04 ml of a 25 percent by weight solution of phosphonitrile chloride in methylene chloride. The reaction mixture is heated to 80° C. and is stirred slowly at this temperature. During the reaction time, a 10 g sample is taken every hour. The samples are each heated in an open crucible at 220° C. for 4 hours in order to remove the volatile constituents. The residues of the samples are shown in Table 3.

TABLE 3

| Reaction time | Residue of the 10 g sample |
|---|---|
| 1 hour | 4.97 g |
| 2 hours | 5.80 g |
| 3 hours | 7.88 g |
| 4 hours | 8.35 g |
| 5 hours | 8.58 g |
| 8 hours | 8.78 g |

A yield of about 79 percent of theory of end product is obtained after a reaction time of only 3 hours.

What is claimed is:

1. A process for preparing diorganopolysiloxanes having terminal Si-bonded hydroxyl groups which comprises reacting an organosilicon compound selected from the group consisting of a cyclic diorganopolysiloxane, a diorganodichlorosilane hydrolysis product and mixtures thereof with from 0.1 to 3 percent by weight of diorganodichlorosilane, based on the weight of the organosilicon compound employed, in the presence of from 1 to 50 ppm by weight of phosphonitrile chloride, based on the total weight of the organosilicon compound and diorganodichlorosilane employed, to form diorganopolysiloxanes containing an Si-bonded chlorine atom in each of the terminal units, treating the reaction mixture with water or an aqueous solution, removing the aqueous phase and thereafter distilling off the low boiling constituents from the diorganopolysiloxanes containing terminal Si-bonded hydroxyl groups.

2. The process of claim 1, wherein the cyclic diorganopolysiloxane has the formula $(R_2SiO)_n$ 

where R is selected from the group consisting of hydrocarbon radicals having from 1 to 18 carbon atoms per radical and halogenated hydrocarbon radicals having from 1 to 18 carbon atoms per radical and n is an integer having a value of from 3 to 11.

3. The process of claim 1, wherein the diorganodichlorosilane hydrolysis product consists of 20 to 30 percent by weight of a cyclic diorganopolysiloxane of the formula $(R_2SiO)_n$ and from 70 to 80 percent by weight of diorganopolysiloxane of the formula $HO(R_2SiO)_mSiR_2OH$ based on the weight of the diorganodichlorosilane hydrolysis product employed, R is selected from the group consisting of hydrocarbon radicals having from 1 to 18 carbon atoms per radical and halogenated hydrocarbon radicals having from 1 to 18 carbon atoms per radical, m is an integer having a value of from 20 to 50 and n is an integer having a value of from 3 to 11.

4. The process of claim 1, wherein the diorganodichlorosilane has the formula $R_2SiCl_2$ wherein R is selected from the group consisting of hydrocarbon radicals having from 1 to 18 carbon atoms per radical and halogenated hydrocarbon radicals having from 1 to 18 carbon atoms per radical.

5. The process of claim 1, wherein the diorganopolysiloxanes containing an Si-bonded hydroxyl group in each of the terminal units are separated from constituents which boil at 140° to 150° C. under 0.5 to 8 hPa (absolute).

6. The process of claim 2, wherein the diorganopolysiloxanes containing an Si-bonded hydroxyl group in each of the terminal units are separated from constituents which boil at 140° to 150° C. under 0.5 to 8 hPa (absolute).

7. The process of claim 3, wherein the diorganopolysiloxanes containing an Si-bonded hydroxyl group in each of the terminal units are separated from constituents which boil at 140° to 150° C. under 0.5 to 8 hPa (absolute).

* * * * *